G. W. HESS.
TRAP.
APPLICATION FILED MAY 28, 1909.
942,069.
Patented Dec. 7, 1909.
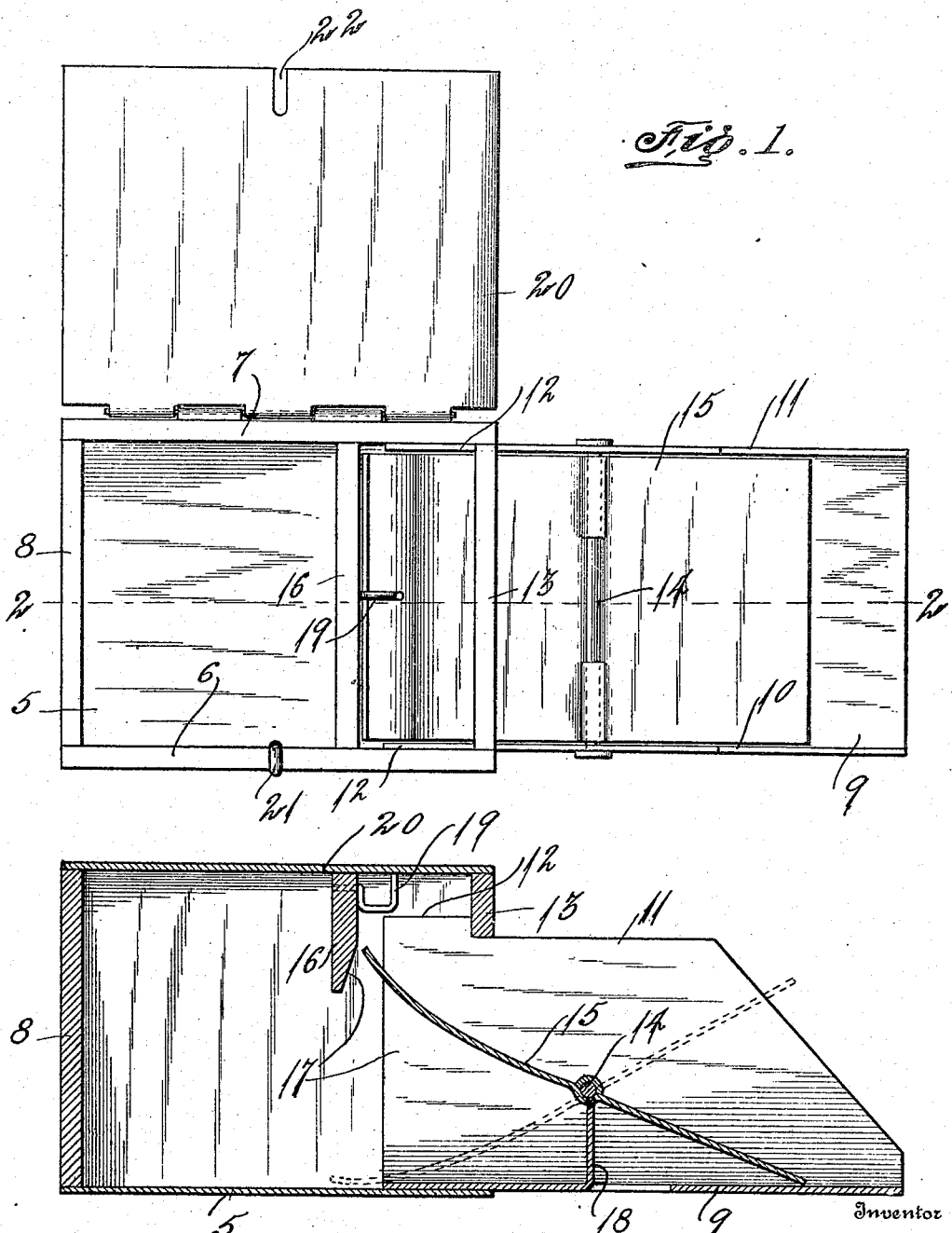
Fig. 1.
Fig. 2.
Witnesses
Jos Gregory.
John A Donegan.
Inventor
George W. Hess.
By 
Attorneys

UNITED STATES PATENT OFFICE.

GEORGE W. HESS, OF HEMPSTEAD, NEW YORK.

TRAP.

942,069.          Specification of Letters Patent.         Patented Dec. 7, 1909.

Application filed May 28, 1909. Serial No. 498,970.

*To all whom it may concern:*

Be it known that I, GEORGE W. HESS, a citizen of the United States, residing at Hempstead, in the county of Nassau, State of New York, have invented certain new and useful Improvements in Traps; and I do hereby declare the following to be a full, clear, and exact description of the invention, such as will enable others skilled in the art to which it appertains to make and use the same.

This invention relates to improvements in animal traps and more particularly to the self-setting type.

It has for its object the provision of a device of that kind wherein the bait is suspended in view of the animal and a false bottom arranged beneath the bait and adapted to move downwardly under the weight of the animal when the latter attempts to reach the bait.

Another object is the provision of a construction whereby the bait may be placed upon the bait hook with little trouble.

With these and other objects in view as will more fully hereinafter appear, the present invention consists in certain novel details of construction and arrangement of parts, hereinafter fully described, illustrated in the accompanying drawings and more particularly pointed out in the appended claims. It being understood that various changes in the form, proportion, size and minor details of the device may be made without departing from the spirit or sacrificing any of the advantages of the invention.

In the accompanying drawings forming part of the specification:—Figure 1 is a plan view of the device showing the cover in raised position. Fig. 2 is a longitudinal sectional view taken on the line 2—2 of Fig. 1, and showing the cover in closed position.

Similar numerals of reference are employed to designate corresponding parts throughout.

As shown in the drawings, a suitable box or casing is provided, from one end of which extends a runway or entrance for the animals. The bottom of the box or casing is designated by the numeral 5 and is oblong in contour and rising from the opposite longitudinal sides of the bottom 5 are the opposite side walls 6 and 7, the rear ends of which are connected by the rear end wall 8.

The front end of the box or casing is open and projecting in advance of the front end is a runway or entrance. This runway or entrance is preferably formed of a single piece of sheet metal or the like bent to substantially a "U" shape, so as to provide a bottom 9 and vertical side walls 10 and 11. The side walls 10 and 11 are considerably less in height than the side walls 6 and 7 of the box or casing, and the distance between said side walls is considerably less than the distance between the side walls 6 and 7, so that the inner end portions of the side walls 10 and 11 will nicely fit between the side walls 6 and 7 of the casing. The inner ends of the side walls 10 and 11 are provided with vertical lugs or extensions 12, and a cross piece 13 is shown having its opposite ends secured to the opposed inner faces of the side walls 6 and 7 of the casing and in a plane with the upper edges thereof. This cross piece 13 forms a stop against which the front sides of the lugs or extensions 12 are adapted to bear and serves to hold the runway secured in the box or casing.

Journaled in the side walls 10 and 11 of the runway and at the center thereof are the opposite ends of a shaft 14 and fixedly secured to this shaft is a false-bottom 15. The length of the false bottom 15 corresponds to the length of the runway, or substantially so, and is connected with the shaft 14 on one side of its longitudinal center. The width of the false-bottom 15 is of a size to nicely fit between the side walls 10 and 11, and owing to its connection with the shaft 14 its outer end or that end adjacent the outer end of the runway will normally bear on the floor of the latter while its inner end will lie adjacent the inner ends of the side walls 10 and 11.

By referring now to Figs. 1 and 2 it will be seen that secured to the opposed inner faces of the side walls 6 and 7 of the box or casing are the opposite ends of a cross piece 16 which is parallel with and spaced from the cross piece 13. The cross piece 16 is arranged adjacent the upper or inner end of the false-bottom 15 with its lower side extending below the plane of the upper end of the false-bottom 15 when the parts are in their normal position as shown in Fig. 2. That portion of the cross piece 16 disposed below the upper end of the false-bottom 15 is beveled as shown at 17 in order to permit the inner end of the bottom 15 to move downward.

By referring now to Fig. 2 it will be seen that the intermediate portion of the bottom 9 of the runway is provided with a vertical wall or partition 18, the upper edge of which bears on the lower side of the shaft 14. This partition 18 serves to prevent the animal from reaching the outer end portion of the false-bottom when the parts are in set position as shown by full lines in Fig. 2.

By referring now to Figs. 1 and 2 it will be seen that a suitable bait hook 19 is provided and has its shank portion secured to the intermediate portion of the cross piece 16. The hook 19 over-lies the upper end of the false bottom 15 and is disposed in the space between the cross pieces 13 and 16, with the terminal of its bill lying in a plane with the upper edges of the said cross pieces.

A cover is designated by the numeral 20 and may be of metal or other suitable material and is of a size to completely seal the open upper end of the box or casing. One of the sides of the cover is hingedly secured to the side wall 7 of the box or casing while the upper end of the opposite side wall is provided with a keeper 21, which is adapted to enter a recess 22 formed in the free side of the cover and serves to lock the cover to the casing when the parts are in position as shown in Fig. 2.

With this construction it is obvious when the cover is raised as shown in Fig. 1 the bait hook 19 will be in easy reach of the operator and the bait may be easily placed thereon. By folding the cover to the opposite side 6 of the casing and securing it by means of the keeper 21 the trap is in set position and an animal entering the runway and moving up the false bottom 15, will, after he has passed the pivotal point of the latter, depress the upper or inner end and slide into the box or casing, after which the outer end of the false-bottom will gravitate to its normal position as shown in Fig. 2.

Thus it can be seen that I have provided a device which is comparatively simple in structure and inexpensive to manufacture, embodying few parts and these so arranged that the danger of derangement will be reduced to a minimum.

Having thus described my invention what is claimed as new, is:—

1. A trap comprising a casing open at its forward end and upper side, a runway having vertical side walls disposed between and extending in advance of the side walls of said casing, said side walls of the runway being provided at their inner upper corners with vertical extensions disposed between the side walls of said casing, a cross piece connecting the upper side portions of the forward ends of the side walls of said casing and having its inner face bearing on the said vertical extensions, an inclined false-bottom pivoted between the side walls of the runway and a pivoted cover forming a closure for the open upper side of the said casing.

2. A trap comprising a casing open at its forward end and upper side, a runway having vertical side walls disposed between and extending in advance of the side walls of said casing, a cross piece at the forward open end of said casing serving to retain said runway against outward movement, an inclined false-bottom pivoted between the side walls of the runway, a second cross piece having its terminals secured to the opposed inner faces of the side wall of the casing and arranged parallel with the first-named cross piece and spaced therefrom, said second-named cross piece being provided on one face with a beveled surface disposed adjacent the inner end of said false-bottom, a bait hook secured to the forward face of the second-named cross piece and arranged above the inner end of the false-bottom and having its terminals lying in a plane with the upper edges of the side walls of the casing, and a cover pivoted to one side wall of the casing and adapted to bear on the upper edge of the opposite side wall and terminal of said bait hook.

In testimony whereof, I affix my signature, in presence of two witnesses.

GEORGE W. HESS.

Witnesses:
C. B. CORNELIUS,
W. JONES.